United States Patent [19]

Petty

[11] Patent Number: 5,687,566
[45] Date of Patent: Nov. 18, 1997

[54] ARRANGEMENT AND METHOD FOR REMOVAL OF AIR FROM A HYDRAULIC SYSTEM

[76] Inventor: Jon A. Petty, 18834 N. 45th Ave., Glendale, Ariz. 85308

[21] Appl. No.: 441,187

[22] Filed: May 15, 1995

[51] Int. Cl.$^6$ .................................................. F16D 31/02
[52] U.S. Cl. ................................................ 60/327; 60/453
[58] Field of Search ............................... 60/327, 453, 454

[56] References Cited

U.S. PATENT DOCUMENTS

| | | | |
|---|---|---|---|
| 2,505,213 | 4/1950 | Schnell | 60/453 X |
| 2,635,620 | 4/1953 | Deardorff | 60/453 X |
| 3,154,087 | 10/1964 | Beaver | 60/453 X |
| 3,157,478 | 11/1964 | Edwards | 60/453 X |
| 3,561,214 | 2/1971 | Bobst | 60/453 X |
| 4,038,823 | 8/1977 | Mostert | 60/584 |
| 4,741,417 | 5/1988 | Caramanna | 188/352 |
| 4,785,629 | 11/1988 | Ennis, III et al. | 60/584 |
| 5,456,078 | 10/1995 | Goloff | 60/453 X |

*Primary Examiner*—Hoang Nguyen
*Attorney, Agent, or Firm*—Antonio R. Durando

[57] ABSTRACT

A hydraulic system has a master cylinder, one or more servo cylinders and a line connecting each servo cylinder to the master cylinder. Air is removed from a line by pumping hydraulic fluid into the respective servo cylinder using a reciprocating hand pump. The pump has a transparent pumping chamber which automatically refills with fluid after each pumping stroke, and the pumping chamber has graduations which indicate the amount of fluid in the pumping chamber. A measured amount of fluid equal to the volume of a line is pumped into the associated servo cylinder. If two servo cylinders are fed by respective branch lines of a common supply line, the amount of fluid pumped into the first servo cylinder equals the volume of the corresponding branch line while the amount of fluid pumped into the second servo cylinder equals the volume of the corresponding branch line plus the volume of the supply line.

32 Claims, 2 Drawing Sheets

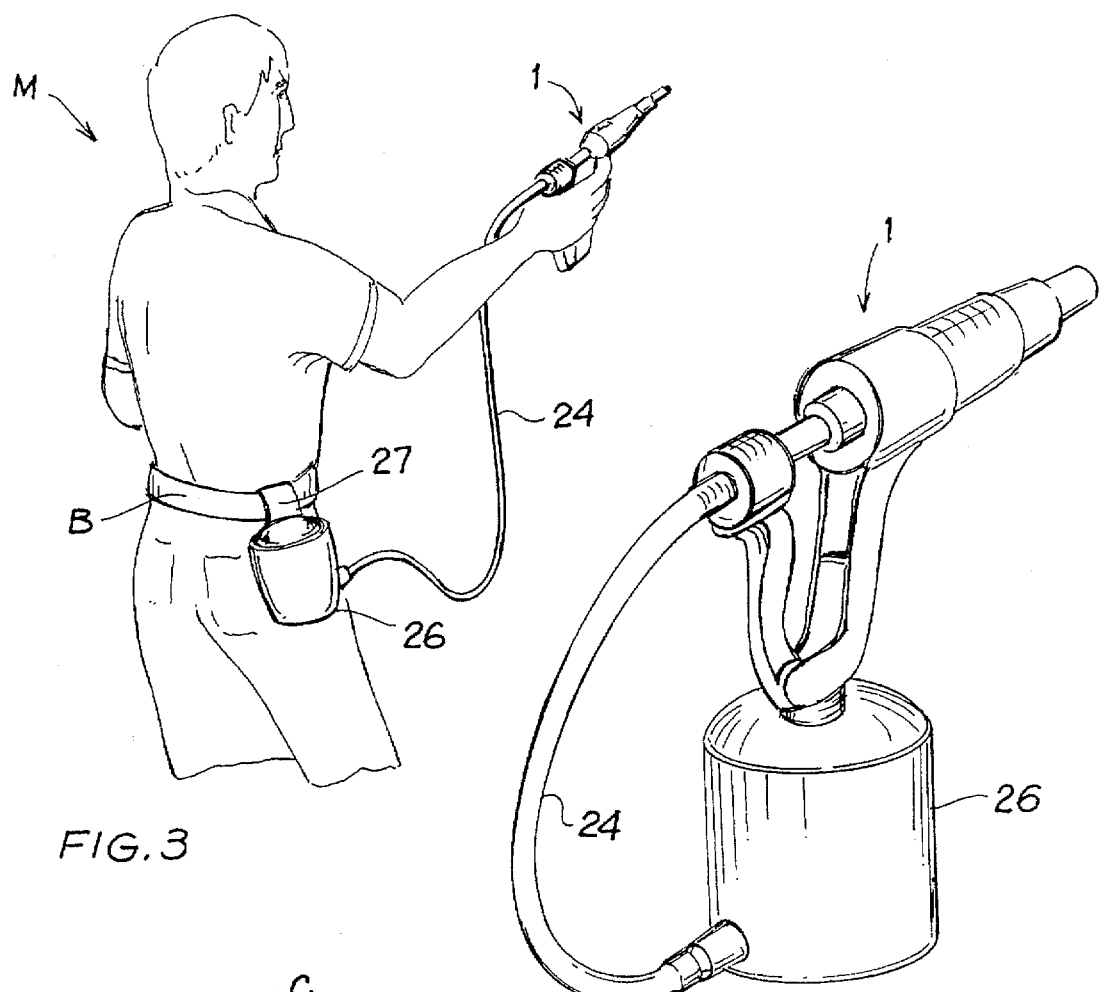
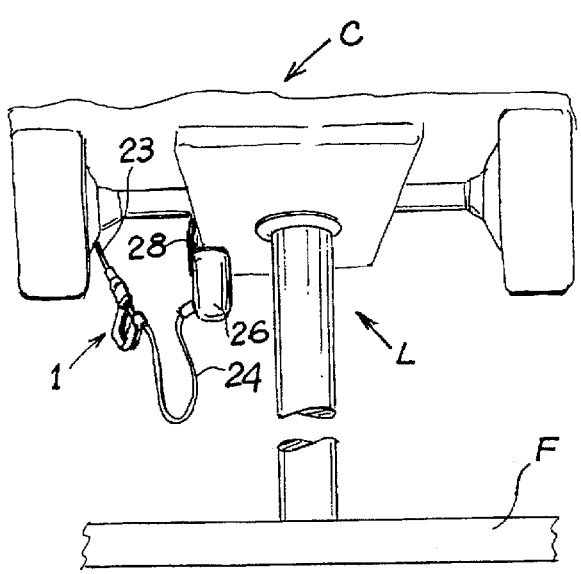
FIG. 3
FIG. 5
FIG. 4

ARRANGEMENT AND METHOD FOR REMOVAL OF AIR FROM A HYDRAULIC SYSTEM

BACKGROUND OF THE INVENTION

1. Field of the Invention

The invention relates to the removal of gas from a hydraulic system.

2. Description of the Prior Art

The braking system of a motor vehicle is generally bled by opening the bleed valve for each brake individually and pumping the brakes. This procedure not only requires two people but is also very time-consuming.

These drawbacks are overcome by U.S. Pat. No. 4,038,823 in which a reciprocating pump is used to pump brake fluid into the servo cylinders of the braking system. Bleeding of a brake is complete when clear brake fluid enters the reservoir of the master cylinder. In order for the person bleeding the brakes to ascertain that clear brake fluid is entering the reservoir, a long feed line must be provided from the pump to the brake being bled. This is cumbersome.

U.S. Pat. No. 4,741,417 employs a motor-driven rotary pump for bleeding a braking system. The pump inlet is immersed in the reservoir of the master cylinder while the pump outlet is connected to a manifold. Flexible hoses lead from the manifold to the bleed valves of the respective servo cylinders. In operation, brake fluid is pumped from the reservoir to the servo cylinders via the manifold and the flexible hoses. The brake fluid returns to the reservoir through the brake lines of the braking system. This arrangement is complicated and, in addition, requires considerable time to set up.

U.S. Pat. No. 4,785,629 eliminates these problems by injecting brake fluid into the servo cylinders via a syringe. However, the syringe is associated with its own difficulties. To begin with, two hands are required to operate the syringe. Furthermore, the syringe cannot be very large since otherwise the force necessary to operate the syringe becomes excessive. Due to the limited size of the syringe, the syringe must be refilled frequently thereby increasing the time to bleed the braking system. In addition, the refilling operation requires disconnection of the syringe from the brake system and the attendant risk of introducing air upon reconnection. Moreover, following the injection of brake fluid with the syringe, the master cylinder must be observed to insure that all air bubbles are dissipated. Finally, as a practical matter people tend to impart too much force to the syringe at the beginning of each bleeding operation and cause rapid flow and upward splashing and/or spilling of fluid from the master cylinder.

BRIEF SUMMARY OF THE INVENTION

It is an object of the invention to provide an arrangement which allows the removal of gas from a hydraulic system to be performed relatively simply.

Another object of the invention is to provide an arrangement which makes it possible to reduce the man-hours required to remove gas from a hydraulic system.

An additional object of the invention is to provide a method which permits gas to be removed from a hydraulic system with relative ease.

A further object of the invention is to provide a method which enables the man-hours necessary for the removal of gas from a hydraulic system to be reduced.

The preceding objects, as well as other which will become apparent as the description proceeds, are achieved by the invention.

One aspect of the invention resides in an arrangement for removing gas from a hydraulic system. The arrangement comprises means for introducing hydraulic fluid into the system, and the introducing means has an inlet for connection to a source of hydraulic fluid and an outlet for connection to the hydraulic system. The arrangement additionally comprises means for connecting the inlet to the hydraulic fluid source. The introducing means includes means for setting and indicating the amount of hydraulic fluid discharged from the outlet.

If a line of a hydraulic system is flushed with a volume of hydraulic fluid equal to the volume of the line, all gas will be removed from the line and there is no need to check for gas bubbles. Since the indicating means permits the amount of hydraulic fluid to be monitored, it is thus possible for a person to remove gas from a hydraulic system without assistance thereby enabling simplification, as well as a reduction in man-hours, to be achieved.

Another aspect of the invention resides in a method of removing gas from a hydraulic system having master cylinder means and servo cylinder means. The method comprises the step of introducing a measured quantity of hydraulic fluid into the servo cylinder means so that the hydraulic fluid flows in a direction from the servo cylinder means to the master cylinder means.

The hydraulic system will generally include means establishing communication between the master cylinder means and the servo cylinder means. The introducing step is preferably terminated when the measured quantity of hydraulic fluid is approximately equal to the volume of the servo cylinder means plus the volume of the establishing means.

According to an additional aspect of the invention, an arrangement for removing gas from a hydraulic system comprises portable means for introducing hydraulic fluid into the hydraulic system, and a portable container for accommodating a body of hydraulic fluid. The introducing means has an inlet for connection to the container and a first outlet for connection to the hydraulic system. The container is provided with a second outlet for connection to the inlet, and the arrangement further comprises means for connecting the second outlet to the inlet.

Inasmuch as the introducing means and the container are portable, these can readily be carried to the location at which hydraulic fluid is to be fed into a hydraulic system. Hence, the lengths of connectors can be kept relatively short with an accompanying simplification. Short connector lengths also make it possible to move rapidly from one location to another so that time savings can be achieved when the feeding of hydraulic fluid is to be performed at multiple locations.

In accordance with another aspect of the invention, a method of removing gas from a hydraulic system having master cylinder means and servo cylinder means comprises the steps of carrying hydraulic fluid to the region of the servo cylinder means, and introducing the hydraulic fluid into the servo cylinder means.

If the hydraulic system constitutes part of a vehicle, the method can additionally comprise the step of supporting the hydraulic fluid on the vehicle. The operation of supporting the hydraulic fluid on the vehicle can be performed magnetically. The hydraulic fluid may alternatively be supported on a person who executes the carrying and introducing steps. Here, the hydraulic fluid can be supported mechanically by clipping an article of wear of the operator.

BRIEF DESCRIPTION OF THE DRAWINGS

Additional features and advantages of the invention will be forthcoming from the following detailed description of preferred embodiments when read in conjunction with the accompanying drawings.

FIG. 3 shows a container of hydraulic fluid which is connected to the pump of FIG. 1 and is attached to the belt of a mechanic.

FIG. 4 illustrates a container of hydraulic fluid which is connected to the pump of FIG. 1 and is mounted on a motor vehicle.

FIG. 5 shows the pump of FIG. 1 constructed as a unit with a container for hydraulic fluid.

DESCRIPTION OF THE PREFERRED EMBODIMENTS

Figure 1:
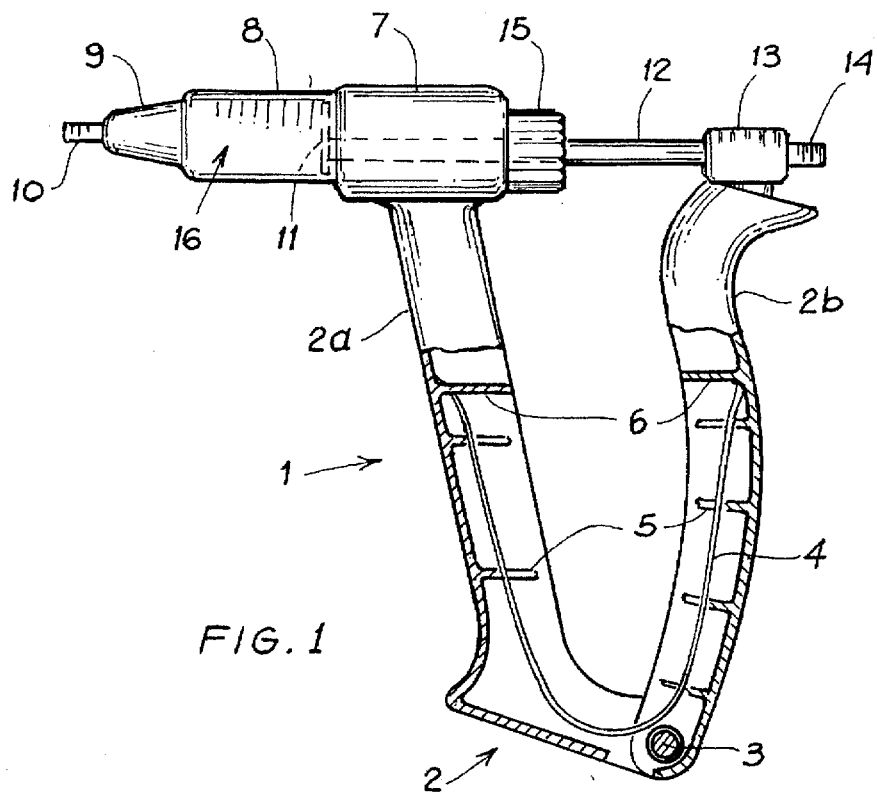
FIG. 1 is a partly broken away side view of a pump according to the invention for introducing fluid into a hydraulic system.

In FIG. 1, the numeral 1 generally identifies a pump for introducing fluid into a hydraulic system. The pump 1, which is a reciprocating hand pump, has a handle 2 which is made up of two parts 2a and 2b. The handle parts 2a,2b are pivotally connected to one another by a pivot 3. A U-shaped spring 4 is located internally of the handle 2 and runs between the handle parts 2a,2b. The spring 4 is maintained in a predetermined position by U-shaped guides 5 molded into the handle 2 and by strip-like abutments 6 disposed in the handle 2 adjacent the ends of the spring 4. The spring 4 urges the handle parts 2a,2b away from one another.

A cylindrical mechanism housing 7 is fixed to the end of the handle part 2a remote from the pivot 3. The mechanism housing 7, which is open at either end thereof, carries a cylindrical injection or pumping housing 8. The injection housing 8, which is transparent and opens to the mechanism housing 7, has an extension 9 with a longitudinal passage. The injection housing 8 is normally sealed from this passage by a check valve located in the passage. The passage extends from the injection housing 8 to a tubular protrusion 10 which projects from the extension 9 and constitutes an outlet of the pump 1.

The injection housing 8 accommodates a piston or plunger 11 which is mounted on one end of a rigid tube 12. The tube 12 defines a flow passage which is open at both ends, and the plunger 11 has a central opening in register with the flow passage. The end of the tube 12 remote from the plunger 11 is fast with an inlet housing 13 which opens to the flow passage in the tube 12. A check valve normally seals the inlet housing 13 from the flow passage in the tube 12. A tubular projection 14 extends from the inlet housing 13 and constitutes an inlet of the pump 1.

The plunger 11 is provided with a peripheral seal which extends circumferentially, and bears against the internal surface, of the injection housing 8. The seal prevents fluid which enters the injection housing 8 from flowing into the mechanism housing 7.

The inlet housing 13 is seated on the end of the handle part 2b remote from the pivot 3. The inlet housing 13 and the handle part 2b engage one another in such a manner that the inlet housing 13 and the handle part 2b can undergo limited relative pivotal movement about an axis parallel to the pivot 3.

A hollow cylindrical adjusting member is accommodated in the mechanism housing 7 and surrounds the tube 12. The adjusting member has a knurled end 15 which extends from the end of the mechanism housing 7 remote from the injection housing 8. The knurled end 15 can be rotated to change the position of the plunger 11 in the injection housing 8 and therefore the volume displaced by each stroke of the plunger 11. The end of the adjusting member remote from the knurled end 15 is provided with a collar, and a washer is mounted on either side of the collar. One of the washers confronts the plunger 11 and prevents the latter from receding into the mechanism housing 7. The other washer holds the adjusting member in the mechanism housing 7 and, to this end, bears against a series of abutments which are distributed circumferentially of the mechanism housing 7 internally thereof.

The injection housing 8 is provided with a series of graduations 16. Since the injection housing 8 is transparent, the graduations 16 allow a user of the pump 1 to measure the amount of fluid discharged through the pump outlet 10.

Assuming that no fluid is initially present in the pump 1 and that the pump inlet 14 is connected to a source of fluid, the pump 1 operates as follows:

A user grasps the pump 1 in one hand. Normally, the user will hold the pump 1 in such a manner that the thumb applies pressure against the side of the handle part 2b which faces away from the handle part 2a. The remaining four fingers then apply pressure against the side of the handle part 2a which faces away from the handle part 2b.

The user now squeezes to draw the handle parts 2a,2b towards one another against the bias of the spring 4. The squeezing action causes relative pivotal movement of the handle parts 2a,2b about the pivot 3, as well as pivotal movement of the inlet housing 13 with respect to the handle part 2b.

Movement of the handle parts 2a,2b towards one another results in displacement of the plunger 11 relative to the injection housing 8. The displacement is such that the plunger 11 and the extension 9 of the injection housing 8 approach one another.

When the plunger 11 and the end of the injection housing 8 adjacent the extension 9 come into abutment, the pressure on the handle parts 2a,2b is relaxed. The handle parts 2a,2b then return to their initial relative position under the action of the spring 4. The plunger 11 and extension 9 likewise move back to their initial relative position.

During the squeezing phase, the check valve for the tube 12 remains closed while the check valve for the extension 9 opens. Thus, fluid is unable to enter the injection housing 8 via the tube 12 but can be discharged from the injection housing 8 through the extension 9. However, since it was assumed that there was initially no fluid in the pump 1, no fluid is discharged from the pump 1 during the first squeezing phase. During the relaxation phase, the check valve for the tube 12 opens whereas the check valve for the extension 9 closes. Consequently, fluid can flow through the pump inlet 14, the inlet housing 13, the tube 12 and the plunger 11 into the injection housing 8. Fluid is drawn into the injection housing 8 because the movement of the plunger 11 and the extension 9 away from one another, in conjunction with the closing of the check valve for the extension 9, creates a vacuum in the injection housing 8. The fluid drawn into the injection housing 8 is unable to exit the latter because the check valve for the extension 9 is closed. The check valve for the tube 12 closes at the end of the relaxation phase.

When the handle 2 of the pump 1 is now squeezed for a second time, the fluid previously drawn into the injection housing 8 is expelled from the pump 1. Thus, the check valve for the extension 9 opens and the plunger 11 forces the fluid through the extension 9 and the pump outlet 10. The expelled fluid is replaced during the following relaxation phase.

By rotating the knurled end 15 of the adjusting member, the plunger 11 can be moved towards and away from the extension 9. The effective volume of the injection housing 8, and hence the volume of fluid drawn into and expelled from the pump 1, can be changed in this manner. The graduations 16 permit a user to set the effective volume of the injection housing 8 with a good degree of precision and to measure the quantity of fluid discharged from the pump 1.

Figure 2:
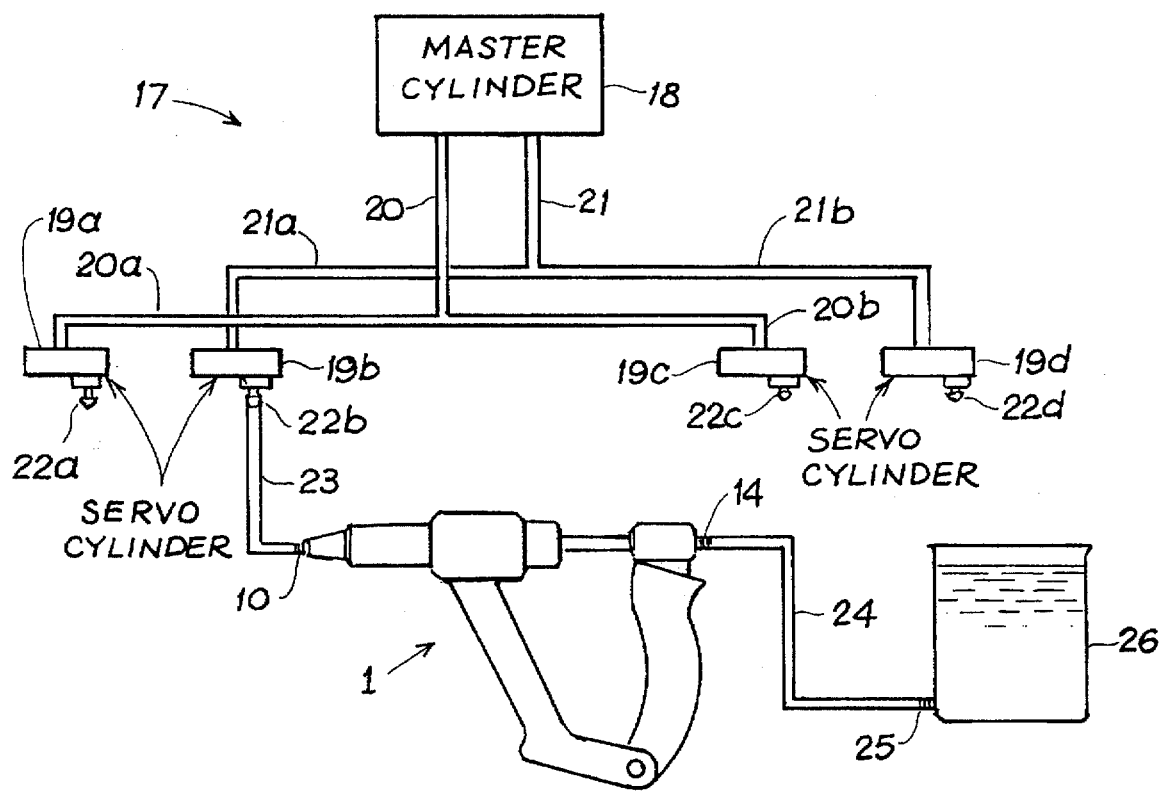
FIG. 2 schematically illustrates the pump of FIG. 1 during the removal of gas from a hydraulic system.

Referring to FIG. 2, the numeral 17 generally identifies a hydraulic system. The hydraulic system 17, which is here assumed to be the braking system of an automobile, includes a master cylinder 18 and four servo or slave cylinders 19a, 19b, 19c and 19d. Each of the servo cylinders 19a–19d operates a respective brake of the automobile.

The master cylinder 18 has two supply lines 20 and 21. The servo cylinders 19a and 19c are connected to the supply line 20 by way of respective branch lines 20a and 20b whereas the servo cylinders 19b and 19d are connected to the supply line 21 by way of respective branch lines 21a and 21b.

In order to purge air from the braking system 17, the servo cylinders 19a–19d are provided with bleed valves 22a, 22b, 22c and 22d, respectively. Currently, the purging of air from the braking system 17 is usually accomplished by having a first person depress the brake pedal while a second person opens the bleed valves 22a–22d one-by-one. Aside from tying up two people, this procedure is very time-consuming and it has been found more effective to feed brake fluid towards the master cylinder 18 via the bleed valves 22a–22d.

This manner of removing air from the braking system 17 is illustrated in FIG. 2 where the outlet 10 of the pump 1 is connected with the bleed valve 22b of the servo cylinder 19b by a hose 23. A second hose 24 connects the inlet 14 of the pump 1 to an outlet 25 of a container 26 which holds a supply of brake fluid.

Normally, the reservoir for the master cylinder 18 is empty or nearly so after the brakes have been serviced. Assuming this to be the case, and assuming that all of the bleed valves 22a–22d are closed, the braking system 17 is purged of air as follows in accordance with the invention:

The bleed valve 22a is opened and is connected by the hose 23 to the outlet 10 of the pump 1. The inlet 14 of the pump 1 is connected by the hose 24 to the outlet 25 of the container 26. A quantity of brake fluid equal to the volume of the servo cylinder 19a plus the volume of its branch line 20a is then pumped through the bleed valve 22a. As a result, the portion of the hydraulic system 17 between the bleed valve 22a and the feed line 20 is purged of air. The graduations 16 make it possible to determine when the amount of brake fluid pumped through the bleed valve 22a equals the volume of the servo cylinder 19a plus the volume of the branch line 20a.

Once this amount of brake fluid has been pumped through the bleed valve 22a, the hose 23 is disconnected from the bleed valve 22a and the latter is closed. The bleed valve 22b is opened and connected to the hose 23. A quantity of brake fluid equal to the volume of the servo cylinder 19b plus the volume of its branch line 21a is thereupon pumped through the bleed valve 22b thereby forcing out air from the portion of the hydraulic system 17 between the bleed valve 22b and the feed line 21.

After the proper quantity of brake fluid has been pumped through the bleed valve 22b, the hose 23 is removed from the bleed valve 22b. The bleed valve 22b is closed, the bleed valve 22c opened and the hose 23 connected to the bleed valve 22c. A quantity of brake fluid equal to the volume of the servo cylinder 19c plus the volume of its branch line 20b plus the volume of the feed line 20 is now pumped through the bleed valve 22c. Consequently, the portion of the hydraulic system 17 between the bleed valve 22c and the master cylinder 18 is cleared of air. Since air was previously removed from the portion of the hydraulic system 17 between the bleed valve 22a and the feed line 20, no air remains trapped between the master cylinder 18 and the bleed valves 22a and 22c.

When the introduction of brake fluid into the bleed valve 22c has been completed, the hose 23 is disconnected from the bleed valve 22c which is thereafter closed. The bleed valve 22d is opened and the hose 23 connected thereto. A quantity of brake fluid equal to the volume of the servo cylinder 19d plus the volume of its branch line 21b plus the volume of the feed line 21 is then pumped through the bleed valve 22d. This purges the portion of the hydraulic system 17 between the bleed valve 22d and the master cylinder 18 of air. Inasmuch as air has already been forced out of the portion of the hydraulic system 17 between the bleed valve 22b and the feed line 21, air is no longer present between the master cylinder 18 and the bleed valves 22b and 22d.

After the requisite amount of brake fluid has been pumped through the bleed valve 22d, the hose 23 is removed from the bleed valve 22d and the bleed valve 22d is closed. This finishes the operation of removing air from the braking system 17.

Thus, according to the invention, a measured amount of brake fluid equal to the volume of the servo cylinders 19a–19d plus the volume of the feed lines 20,21 plus the volume of the branch lines 20a,20b,21a,21b is pumped into the braking system 17. This ensures, without the need to look for air bubbles, that the braking system 17 is thoroughly purged of air.

The pump 1 and the container 26 are preferably portable so that a user can easily carry the pump 1 and the container 26 from one of the servo cylinders 19a–19d to the other.

In order to facilitate carrying of the pump 1 and the container 26 from location to location, the container 26 can be provided with a device for securing the container 26 to an article of wear of a user. This is illustrated in FIG. 3 where M denotes a mechanic and B a belt worn by the mechanic M. A clip 27 is mounted on the container 26 and allows the latter to be clipped to the belt B of the mechanic M. The clip 27 not only makes it easier for the mechanic M to carry around the container 26 but also makes it unnecessary for the mechanic M to hold the container 26, or to set down the container 26, during the removal of air from the braking system 17.

To further facilitate carrying of the pump 1, the container 26 can be provided with a non-illustrated hook for hanging the pump 1 on the container 26.

FIG. 4 shows a car C which is being held in an elevated position by a hydraulic lift L anchored in a foundation F. In FIG. 4, the container 26 is formed with a permanent magnet 28 which allows the container 26 to be suspended from the car C in the vicinity of the bleed valve connected to the pump 1.

The hose 23 can be dispensed with. Moreover, if necessary or desirable, adapters can be provided in order to adapt the hose 23 and/or the outlet 10 of the pump 1 to different bleed valves. It is also possible, as shown in FIG. 5, to construct the pump 1 and the container 26 as a unit.

Additionally, the pump 1 can constitute part of a kit which may further include one or more hoses or hose assemblies, one or more adapters and instructions.

The invention is applicable to hydraulic systems other than braking systems, e.g., to clutch systems. Furthermore, the invention can be used to purge individual components of a hydraulic system such as, for instance, a brake master cylinder, a clutch master cylinder or a clutch servo cylinder.

Among the advantages achievable with the invention are the following:

1. The removal of gas from a hydraulic system can be accomplished by a single individual without a need to check for gas bubbles. Thus, by matching the quantity of hydraulic fluid pumped to the volume to be purged, thorough purging is assured.

2. The removal of gas from a hydraulic system can be carried out with relative ease. Knowing the volume to be purged and the capacity of the pump 1, it is simply necessary to count the number of strokes which yield a volume of hydraulic fluid equal to the volume to be purged.

3. The pump 1 can be manufactured relatively inexpensively.

4. The removal of gas from a hydraulic system can be completed relatively quickly. On the one hand, it has been found that it is much less time-consuming to introduce hydraulic fluid into the bleed valves 19a–19d than to open the bleed valves 19a–19d and depress the brake pedal. On the other hand, the pump 1 refills automatically after each stroke so that little time is lost in recharging the pump 1.

5. The pump 1 can be operated with one hand thereby leaving one hand free for other tasks.

6. The pump 1 does not require a complicated set up.

7. If necessary or desirable, it is a simple matter to draw fluid from a hydraulic system by reversing the pump 1.

8. The pump 1 is highly maneuverable and can be readily manipulated within the restricted spaces frequently present around hydraulic systems.

9. The clip 27 and magnet 28 permit the container 26 to be positioned close to the working area so that the hoses 23 and 24 can be relatively short. This further enhances maneuverability.

10. In a facility where air is to be removed from the hydraulic systems of a large number of cars, a mechanic can carry the pump 1 and the container 26 from car to car and work on many cars in sequence.

11. The pump 1 does not require refilling during normal operation, thereby eliminating the risk of introducing air into the hydraulic system.

Various modifications in addition to those described above can be made within the meaning and range of equivalence of the appended claims.

I claim:

1. An arrangement for removing a contaminant from a hydraulic system, comprising a member for introducing hydraulic fluid into the hydraulic system, said introducing member having an inlet for communicating with a source of hydraulic fluid, an outlet discrete from said inlet for communicating with the hydraulic system a holding chamber for hydraulic fluid to be discharged through said outlet, an expelling element for forcibly expelling hydraulic fluid through said outlet, and a device for fixing the effective volume of said chamber at any one of a plurality of values.

2. The arrangement of claim 1, wherein said introducing member comprises a pump.

3. The arrangement of claim 2, wherein said pump is a hand pump.

4. The arrangement of claim 2, wherein said pump is a reciprocating pump.

5. The arrangement of claim 1, wherein said introducing member comprises at least partly transparent wall means defining said chamber, said wall means being provided with graduations.

6. The arrangement of claim 1, further comprising means for establishing communication between said inlet and the hydraulic fluid source, said establishing means including a hose.

7. The arrangement of claim 1, further comprising means for establishing communication between said outlet and the hydraulic system.

8. The arrangement of claim 7, wherein said establishing means comprises a hose.

9. The arrangement of claim 1, further comprising a container for accommodating a body of hydraulic fluid, said introducing member being capable of being carried by a person together with said container when said container accommodates a body of hydraulic fluid, and said container being provided with an outlet for communicating with said inlet.

10. The arrangement of claim 9, wherein said container is provided with means for attaching said container to an object.

11. The arrangement of claim 10, wherein said attaching means comprises a magnet.

12. The arrangement of claim 10, wherein said attaching means comprises a clip.

13. An arrangement for removing a contaminant from a hydraulic system, comprising a member for introducing hydraulic fluid into the hydraulic system, said introducing member having an inlet, a first outlet discrete from said inlet for communicating with the hydraulic system, and means for forcibly expelling hydraulic fluid through said outlet; and a container for accommodating a body of hydraulic fluid, said container having a second outlet for communicating with said inlet, and said introducing member being capable of being carried by a person together with said container when said container accommodates a body of hydraulic fluid.

14. The arrangement of claim 13, wherein said introducing member comprises a pump.

15. The arrangement of claim 14, wherein said pump is a hand pump.

16. The arrangement of claim 14, wherein said pump is a reciprocating pump.

17. The arrangement of claim 13, further comprising means for establishing communication between said second outlet and said inlet, said establishing means including a hose.

18. The arrangement of claim 13, further comprising means for establishing communication between said first outlet and the hydraulic system.

19. The arrangement of claim 18, wherein said establishing means comprises a hose.

20. The arrangement of claim 13, wherein said container is provided with means for attaching said container to an object.

21. The arrangement of claim 20, wherein said attaching means comprises a magnet.

22. The arrangement of claim 20, wherein said attaching means comprises a clip.

23. A method of removing at least one contaminant from hydraulic systems, comprising the steps of making a first adjustment to fix the effective volume of a chamber at a first value; introducing a first quantity of hydraulic fluid into said chamber while maintaining said first adjustment; forcing said first quantity of hydraulic fluid from said chamber into a hydraulic system; making a second adjustment to fix the effective volume of said chamber at a second value different from said first value; introducing a second quantity of hydraulic fluid into said chamber while maintaining said second adjustment; and forcing said second quantity of hydraulic fluid from said chamber into a hydraulic system.

24. The method of claim 23, wherein said first quantity of hydraulic fluid is forced into a hydraulic system having master cylinder means, servo cylinder means and means establishing communication between said master cylinder means and said servo cylinder means, said first quantity of hydraulic fluid being equal or approximately equal to the volume of said servo cylinder means plus the volume of said establishing means.

25. The method of claim 23, wherein said first quantity of hydraulic fluid is confined in a container prior to introduction into said chamber; and further comprising the step of carrying said chamber together with said container and said first quantity of hydraulic fluid to the region of the hydraulic system into which said first quantity of hydraulic fluid is forced, the carrying step being performed by a person.

26. The method of claim 25, wherein the hydraulic system into which said first quantity of hydraulic fluid is forced constitutes part of a vehicle; and further comprising the step of supporting said container on said vehicle.

27. The method of claim 26, wherein the supporting step is performed magnetically.

28. The method of claim 25, further comprising the step of clipping said container to an article of wear of the person.

29. A method of removing a contaminant from a hydraulic system, comprising the steps of carrying a container of hydraulic fluid to the region of said hydraulic system together with a holding chamber for said hydraulic fluid, the carrying step being performed by a person; transferring at least a portion of said hydraulic fluid from said container to said chamber; and introducing said portion of said hydraulic fluid into said hydraulic system from said chamber.

30. The method of claim 29, wherein said hydraulic system constitutes part of a vehicle; and further comprising the step of supporting said container on said vehicle.

31. The method of claim 30, wherein the supporting step is performed magnetically.

32. The method of claim 29, further comprising the step of clipping said container to an article of wear of the person.

* * * * *